United States Patent [19]

Matsuzawa

[11] Patent Number: 5,624,194
[45] Date of Patent: Apr. 29, 1997

[54] PRINTER DEVICE WITH FACSIMILE FUNCTION FOR SWITCHING FUNCTIONS OF INPUT KEYS AND FOR MANAGING RESERVATION DATA

[75] Inventor: Kunihiko Matsuzawa, Tokyo, Japan

[73] Assignee: NEC Corporation, Tokyo, Japan

[21] Appl. No.: 363,312

[22] Filed: Dec. 23, 1994

[30] Foreign Application Priority Data

Dec. 24, 1993 [JP] Japan ................................. 5-347894

[51] Int. Cl.$^6$ ............................................ B41J 5/28
[52] U.S. Cl. ........................ 400/477; 400/472; 341/23
[58] Field of Search ........................ 400/83, 477, 472, 400/485, 486, 703; 341/23; 345/173

[56] References Cited

U.S. PATENT DOCUMENTS

| | | | |
|---|---|---|---|
| 4,702,630 | 10/1987 | Igi et al. | 400/82 |
| 4,836,699 | 6/1989 | Babsch et al. | 341/23 |
| 4,973,960 | 11/1990 | Mount, II | 341/23 |
| 5,059,960 | 10/1991 | Rosenberg | 341/23 |
| 5,070,467 | 12/1991 | Todome | 395/166 |
| 5,075,686 | 12/1991 | Shigemura | 341/23 |
| 5,121,113 | 6/1992 | Kedge | 341/23 |
| 5,288,158 | 2/1994 | Matias | 400/486 |
| 5,336,002 | 8/1994 | Russo | 400/486 |
| 5,352,050 | 10/1994 | Choate | 400/486 |

FOREIGN PATENT DOCUMENTS

| | | | |
|---|---|---|---|
| 0244869 | 11/1987 | European Pat. Off. | 341/23 |
| 0262603 | 4/1988 | European Pat. Off. | 341/23 |
| 0443804 | 8/1991 | European Pat. Off. | 341/23 |
| 0477947 | 4/1992 | European Pat. Off. | 341/23 |

*Primary Examiner*—Stephen R. Funk
*Assistant Examiner*—Steven S. Kelley
*Attorney, Agent, or Firm*—Sughrue, Mion, Zinn, Macpeak & Seas

[57] ABSTRACT

A printer device with facsimile function including: a printer for printing printing data; a facsimile for transmitting data input from a scanner to another party's facsimile using a telephone line; an operation panel provided with an operation command input device having a plurality of command input keys, including a first switch for selecting either a facsimile function or a printer function and a second switch for switching some of the plurality of input keys to numerical data input keys; a memory for storing reservation data input from the input keys for communication with a facsimile; and a control section for setting some of the plurality of operation command input keys to the numerical data input keys when the first switch is operated to select a facsimile function and the second switch is operated to switch to the numerical data input keys, for converting numerical data input from the numerical data input keys to dial data, and for controlling a write/read operation of the reservation data to the storing means.

2 Claims, 4 Drawing Sheets

PRINTER DEVICE WITH FACSIMILE FUNCTION FOR SWITCHING FUNCTIONS OF INPUT KEYS AND FOR MANAGING RESERVATION DATA

BACKGROUND OF THE INVENTION

This invention relates to a printer device with facsimile function, in particular, a printer device with facsimile function configured so the entire device can be switched either to facsimile mode or printer mode by an external command.

Because prior printer devices with facsimile function were not provided with dial functions, data transmission was conducted after first dialing a telephone externally attached to the printer to call the other party's facsimile. When a connection was established with the facsimile of the other party via a telephone line, data was read in by an attached scanner and the data thus obtained was transmitted to the other party's facsimile. When data transmission was complete, once again signals were exchanged with the other party's facsimile, followed by breaking of the connection with the other party's facsimile.

Also, output density, image quality setting and other transmission settings were made by various special operation keys before data transmission on line was started.

However, because the prior printer devices with facsimile function were not equipped with a dial function, an externally attached telephone was necessary, and at the same time, operation required dialing the externally attached telephone to call the other party's facsimile. In addition, there was no memory function to record the telephone number, etc. of the other party's facsimile.

Also, because operation was conducted using separate special operation keys for transmission settings, it was necessary to have separate operation keys for operations of printer and facsimile. Thus, because many operation keys were used on the operation panel, the operation panel became large enough to cause inconvenience.

SUMMARY OF THE INVENTION

It is an object of the present invention to provide a multi-functional printer device with facsimile function that solves the above-mentioned problems, enables to minimize the size of entire device and is not necessary to have a separate external telephone for transmitting data.

The object of the present invention is achieved by a printer device with facsimile function comprising: a printer means for printing printing data; a facsimile means for transmitting data input from a scanner to other party's facsimile using a telephone line; an operation panel provided with an operation command input means having a plurality of command input keys, a first switch for selecting either facsimile function or printer function and second switch for switching a part of the plurality for operation command input keys to numerical data input keys; a storing means for storing reservation data input from the operation command input keys and to be used for facsimile communications; and a control section for setting a earn of the plurality of operation command input keys as the numerical data input keys when the first switch selects facsimile function and the second switch selects numerical data input keys, for converting a numerical data input from the numerical data input keys to a dial data, and for controlling write and read operations of the reservation data to the storing means.

By the present invention, an externally attached telephone which conventionally was considered necessary can be dispensed with, because the numerical data input through the ten keys can be converted to a dial data and output by operations of a function switching means and a main control section.

Also, operation of the ten key setting switch makes it possible to use ten keys as other types of keys or as function keys even in facsimile mode.

Moreover, due to the operation of the storing means and the main control section, it becomes possible to take a verbatim record of the transmitted data identifying the other party and the transmission conditions of its facsimile and read it out any time, as necessary.

These points make it possible to increase the multifunctional capabilities of the entire device, and concomitantly, its functional effectiveness, making it possible to provide a superior facsimile function-equipped printer than conventionally possible.

This and other objects, features and advantages of the present invention will become more apparent upon a reading of the following detailed description and drawings.

DESCRIPTION OF THE PREFERRED EMBODIMENTS

Next, an embodiment of this invention is explained, referring to the figures.

Figure 1:
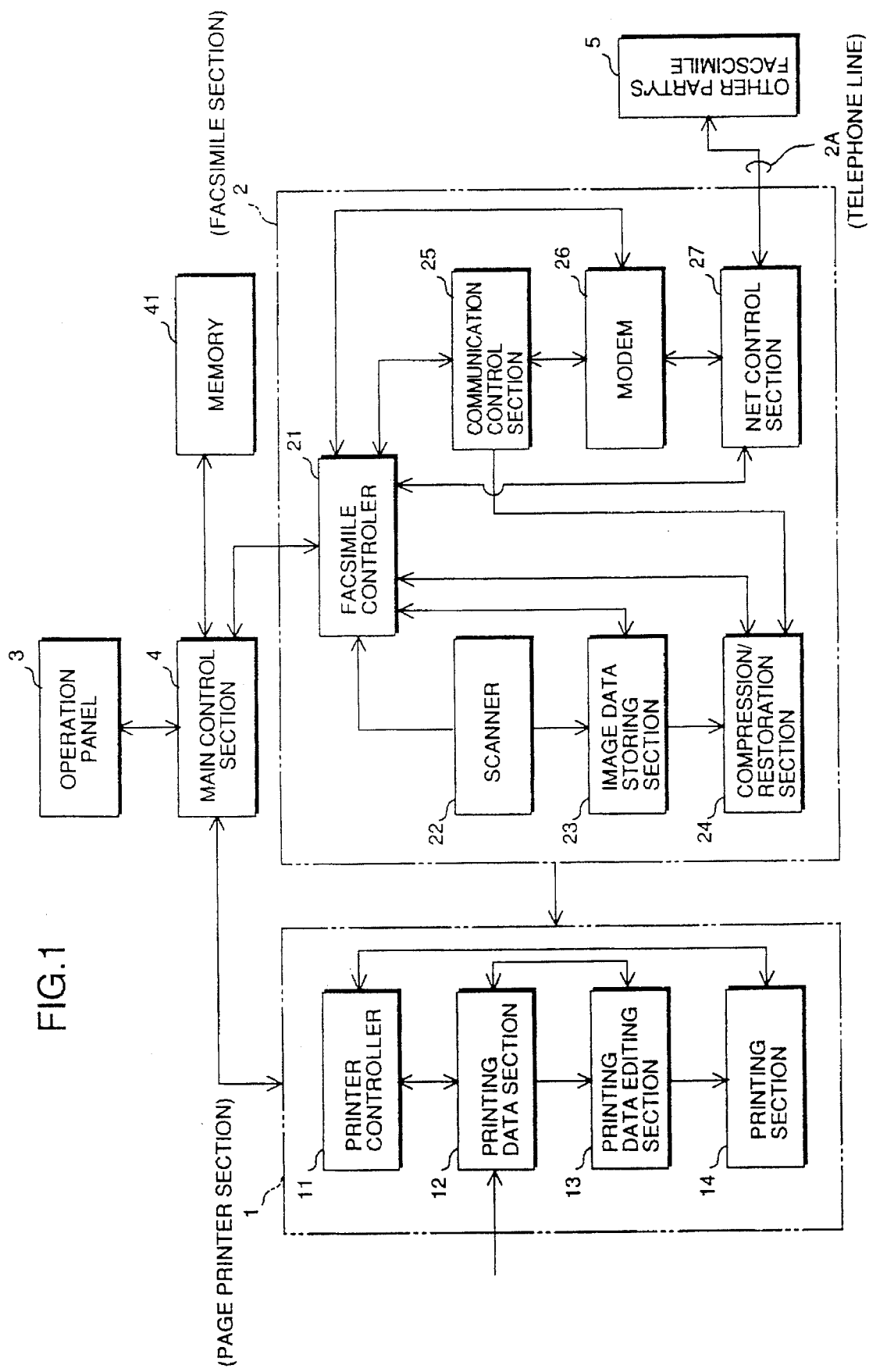
FIG. 1 is a block diagram showing an embodiment of this invention.

FIG. 1 shows an embodiment of this invention. In FIG. 1, Number 1 is a page printer section, Number 2 is a facsimile section, Number 3 is an operation panel and Number 4 is an main control section.

Page printer section 1 comprises a printing data section 12 for inputting printing data sent from upper devices, a printing data editing section 13 for editing input printing data, a printing section 14 for printing edited printing data on a sheet of paper and a print controller 11 for controlling the various parts of the page printer.

The facsimile section 2 comprises a scanner 22 for reading in data for transmission, an image data storing section 23 for storing image data read in by the scanner 22 in a data buffer, a compression restoration section 24 for conducting compression processing of image data in the image data storing section 23, a communication control section 25 for controlling exchange of signals with other party's facsimile 5, a modem section 26 for modulating compressed image data, a net control section 27 for transmitting and outputting image data from the modem section 26 via telephone line 2A to other party's facsimile 5 and a facsimile controller 21 for controlling each of these sections.

Figure 2:
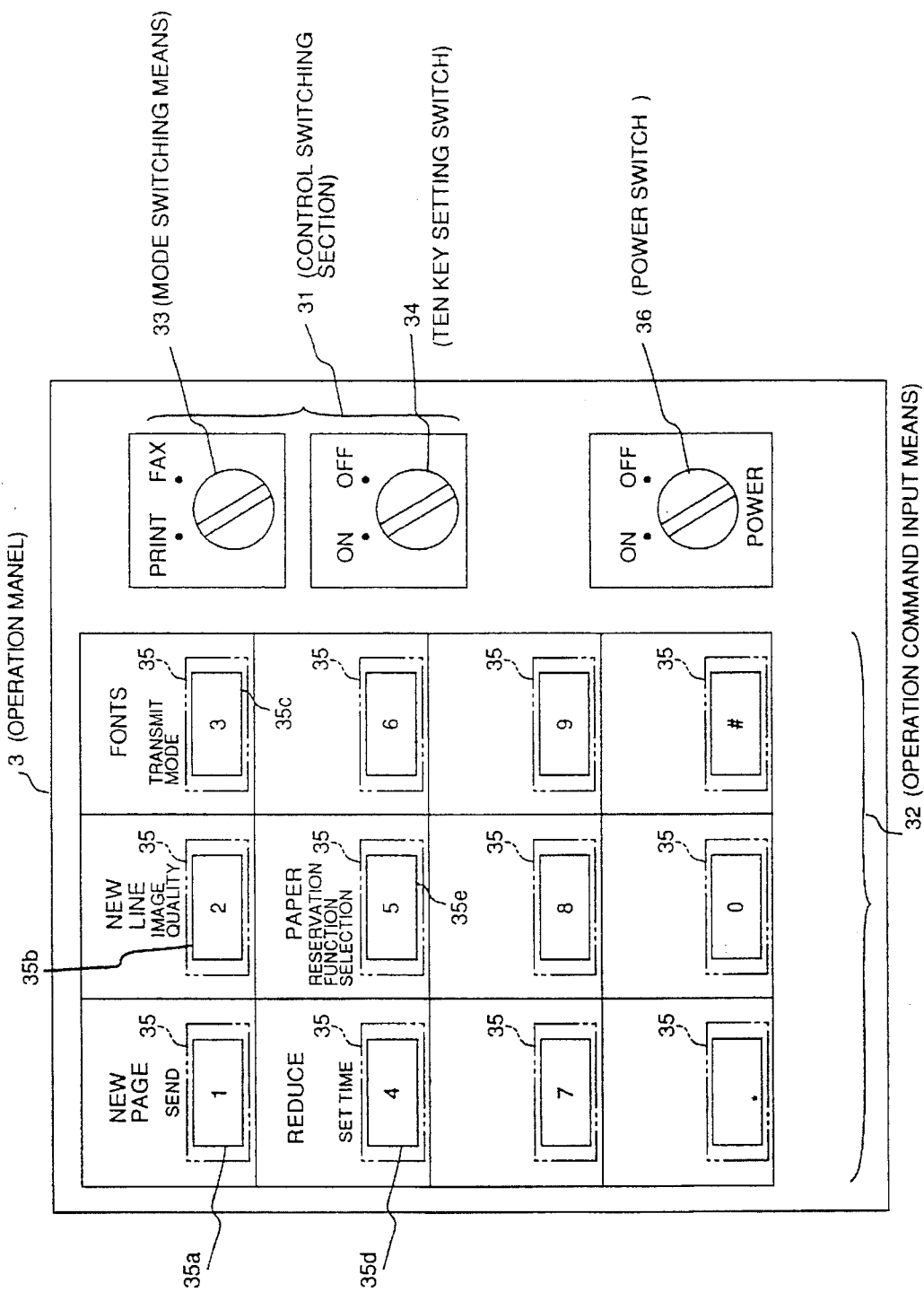
FIG. 2 is an external view of an operation panel of this invention.

As shown in FIG. 2, the operation panel 3 comprises a control switching section 31 and an operation command input means 32. Among these controls, the control switching section 31 comprises a mode switching means 33 for switching between printer mode and facsimile mode and setting each mode, and a ten key setting switch 34 for switching operation command input keys 35 of an operation command input means 32 to ten keys for numerical data input or function keys for operation command input.

When mode switching means 33 is set to printer mode, input signals such as an operation command, etc. input from the operation panel 3 are input to the main control section 4, which sets the entire device to printer mode and input signals such as an operation command, etc. are output from the main control section 4 to printer controller 11.

When mode switching means 33 is set to facsimile mode, the input signals such as operation commands, etc. input from the operation panel 3 are input to the main control section 4, the main control section 4 sets the entire device to facsimile mode and the input signals such as operation commands, etc. are output from the main control section 4 to the facsimile controller 21.

Next, when ten key setting switch 34 is turned on, some of the operation command input keys 35 within the operation command input means 32 function as ten keys for numerical data input by the main control section 4. Numerical data output to the controller specified by mode switching means 33 via the main control section 4 is converted to dial data in the main control section 4 and output to the facsimile controller 21.

When the ten key setting switch 34 is turned off, the operation command input keys 35 of the operation command input means 32 function as function keys for input of operation commands by the control section 4. These are output from the controller specified by the mode switching means 33 via the main control section 4.

When the operation command input means 32 functions as function keys, the functions of the operation command input keys 35 can be switched between printer mode and facsimile mode. For example, in printer mode, "New page" key 35a, "New line" key 35b, "Font" key 35c, "Reduce" key 35d and "Paper" key 35e, etc. become "Send" key 35a, "Image quality" key 35b, "Transmit mode" key 35c, "Set time" key 35d and "Reservation function selection" key 35e, etc. in facsimile mode.

In this way, by changing the settings of the mode switching means 33 and the ten key setting switch 34 of the control switching section 31, the operation command input keys 35 of the operation command input means 32 can be set as three types of data input keys, i.e., ten keys, printer function keys or facsimile function keys by the ten key setting switching function of the main control section 4, so there is no need to have separate sets of operation command input keys 35. This multifunctional use of the operation command input keys 35 of the operation panel 3 makes possible the reduction of the number of keys used.

When the ten key setting switch 34 is switched "ON" and the facsimile mode is selected by the mode switching means 33, numerical data input from the ten keys is converted to dial data by the dial function of the main control section 4 and is output to the facsimile controller 21, so there is no need for an externally attached telephone.

In facsimile mode, when "reservation function selection" key 35e is input, the following reservation data input through the operation command input means 32 is stored in the memory 41 of the main control section 4. Among the classifications of reservation data that can be registered are "other party's telephone number", "transmission reservation time", "image quality", "transmit mode" and the like. Reservation data settings can be selected as necessary. When input of the various items of reservation data is complete, a reservation number (for example, 01) is input at the end. The main control section 4 specifies the writing in of this reservation data with the reservation number as a key, then the reservation function setting is terminated.

Next, operations of a printer device with facsimile function configured as above are explained.

First, in facsimile transmission, the mode switching means 33 of the control switching section 31 provided on the operation panel 3 is switched to facsimile mode, the entire device is set as facsimile mode, input data such as an operation command and the like from the operation command input means 32 provided on the operation panel 3 are input to the main control section 4, and the data are output to the facsimile controller 21 from the main control section.

Then, when the ten key setting switch 34 of the control switching section 31 is turned on, a part of the operation command input keys 35 of the operation command input means 32 are made to function as ten keys for input of numerical data by the main control section 4, and a numerical data signal from the ten keys is input to the main control section 4. The numerical data input to the main control section 4 is converted to a dial data, and output to the facsimile controller 21.

Next, when the ten key setting switch 34 is turned off, the main control section 4 switches each of the operation command input keys and 35 to function keys, an operation command signal from the function keys is input to the main control section 4.

Figure 3:
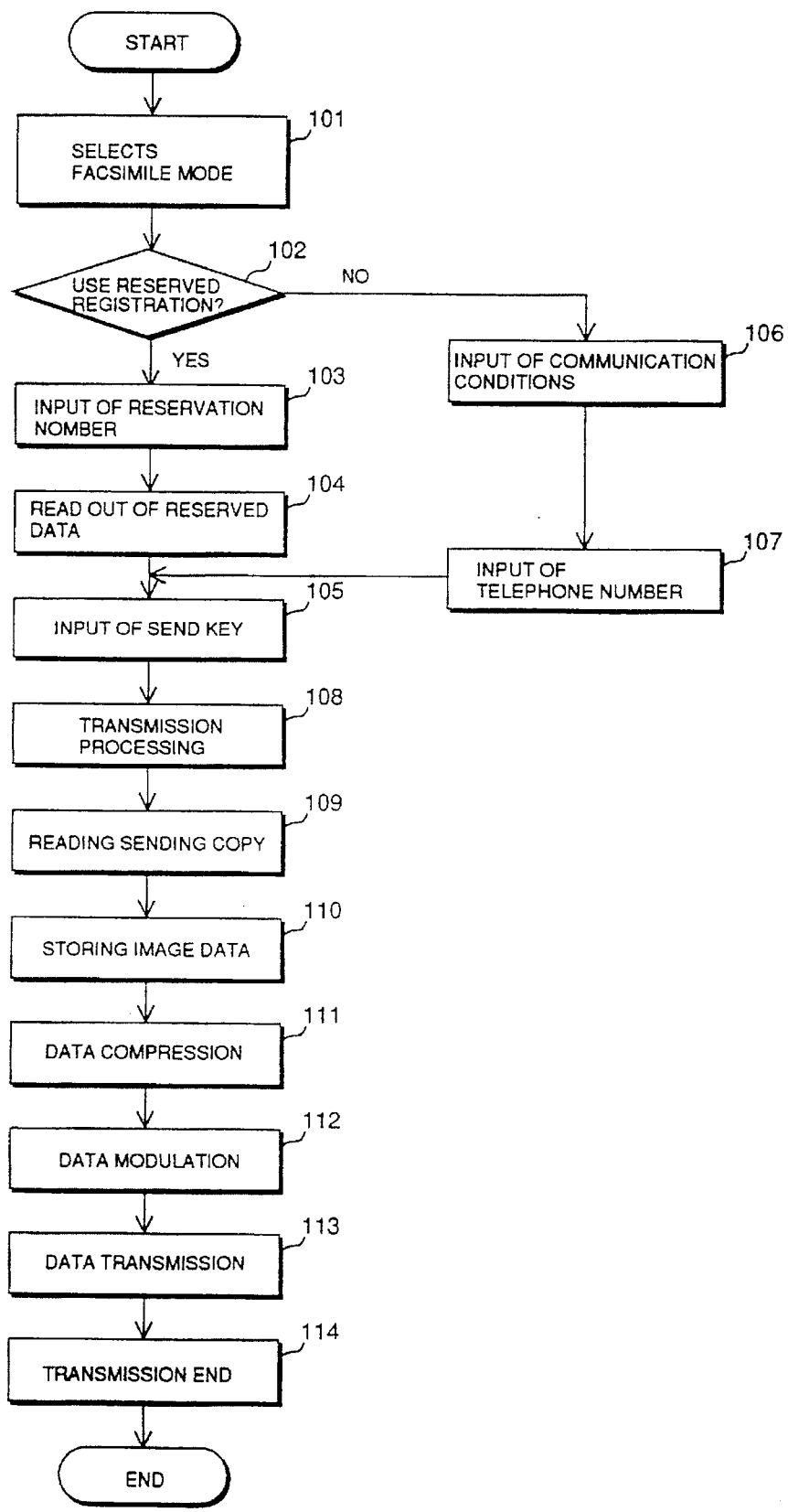
FIG. 3 is a flow chart showing operation during facsimile transmission.
Figure 4:
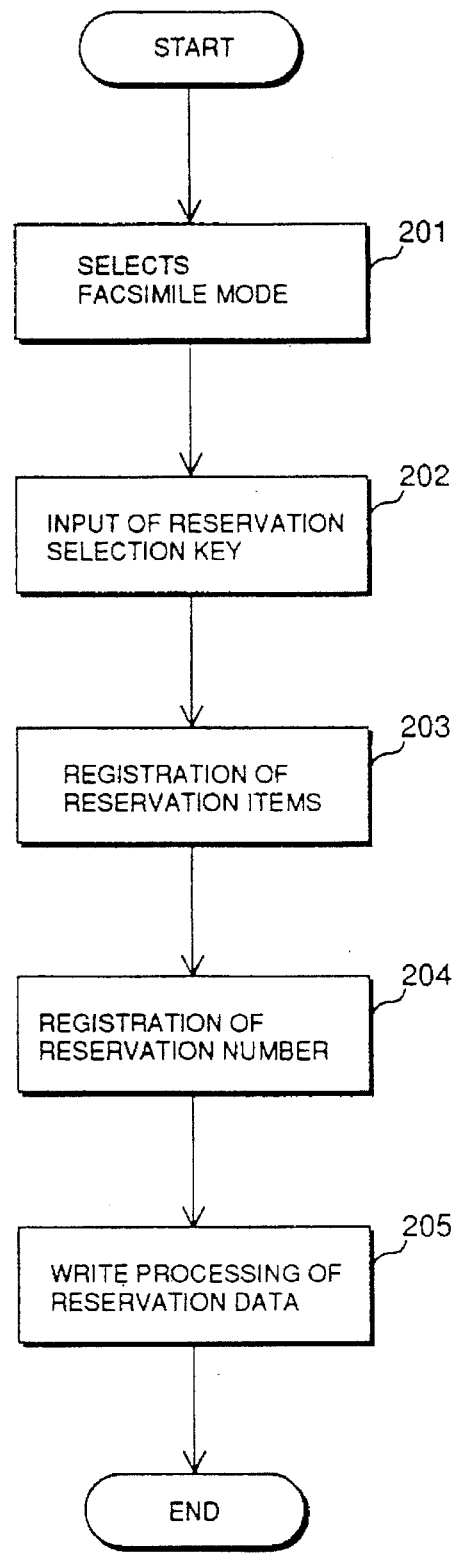
FIG. 4 is a flow chart showing operations during reservation registration.

Moreover, operations of the embodiment at facsimile mode are explained, based on flow charts of FIG. 3 and FIG. 4.

FIG. 3 is a flow chart showing operations during facsimile transmission. First, the mode switching means 33 is set to facsimile mode (Step 101). The main control section 4 sets the entire device to facsimile mode and the signals from the operation panel 3 that follow are output to the facsimile controller 21 via the main control section 4.

Next, determination is made whether or not the other party's telephone number and transmission conditions are registered (Step 102). If they are, the flow continues to Step 103, and if they are not, to Step 106. In Step 103, the ten key setting switch 34 is turned on, a part of the operation command input keys 35 are made to function as ten keys for input of numerical data and a reservation number (for example, 01) is input by these ten keys (Step 103).

When a reservation number is input, the main control section 4 reads out reservation data from the memory 41 and outputs the data to the facsimile controller 21 (Step 104). Next, the ten key setting switch 34 is turned off to activate function keys and "Transmit" key 35a is input (Step 105).

If a reservation data is not registered, in Step 106 the ten key setting switch 34 is turned on or off as appropriate to use function keys or hen keys to input "Image quality", "Transmit mode" or other transmission condition settings (Step 106). These transmission conditions are output as control signals from the facsimile controller 21 to the various sections within the facsimile section 2. The ten key setting switch 34 is turned on to switch the operation command input keys 35 to ten keys, and the telephone number of the other party is input through the ten keys (Step 107).

After the telephone number of the other party is input, similarly to the case that a reservation data is registered, the flow moves on to Step 105, the ten key setting switch 34 is turned off to switch to function keys and "Transmit" key 35a is input (Step 105).

When "Transmit" key 35a is input, the facsimile controller 21 gives a command to the control section 25 to dial the other party's telephone number and begins communication processing for transmission and reception of data with the other party's facsimile 5 (Step 108).

If the other party's facsimile 5 is ready to receive, the facsimile controller 21 gives a command for the scanner 22 to read in transmission data (Step 109). The image data read in by the scanner 22 is then stored in the data buffer of the image data record section 23 (Step 110). This image data is output successively from the image data section 23 to the compression/restoration section 24 and is compressed at the compression/restoration section 24 (Step 111). The compressed image data is output to the modem section 26 via the communication control section 25, and is modulated at the modem section 26 (Step 112). The modulated image data is transmitted from the net control section 27 to the other party's facsimile 5 via the telephone line 2A (Step 113).

When the other party's facsimile 5 receives the image data and finishes printout, the facsimile controller 21 conducts communication completion processing (Step 114).

FIG. 4 is a flow chart showing operation at the time of registration of reservation data. First, the mode switching means 33 is switched to facsimile mode (Step 201) and registration data reservation signals output from the operation panel 3 are output to the main control section 4. Next, "Reservation function selection" key 35e is input (Step 202) and the following input data input from the operation command input means 32 is written and recorded as reservation data in the memory 41 of the main control section 4.

Reservation data that can be registered includes "other party's telephone number," "transmission reservation time," "Image quality", "Transmit mode" and the like. The ten key setting switch 34 is turned on or off as appropriate for operation of the function keys or the ten keys to input other transmission condition settings such as "image quality", "Transmit mode", etc. (Step 203).

When input of each classification of reservation data is complete, finally a reservation number (for example, 01) is set and input (Step 204). When the reservation number is input, the main control section 4 specifies the writing in this number to the reservation data memory 41 (Step 205), and then the reservation function is terminated.

During facsimile transmission, input of reservation numbers causes readout of transmission conditions such as the "other party's telephone number" registered in the memory 41 of the main control section 4 and the data are output to the facsimile controller 21. The facsimile controller 21 automatically dials, and transmission occurs in accordance with transmission conditions.

What is claimed is:

1. A printer device with a facsimile function, said device consisting of:

a printer means for printing data;

a facsimile means for transmitting data input from a scanner to another party's facsimile using a telephone line;

an operation panel provided with an operation command input means having a plurality of depressible keys which each alternately function as command input keys or numerical data input keys, a first switch for selecting one of a facsimile function and a printer function, and a second switch for switching at least some of said plurality of command input keys to numerical data input keys;

a storing means for storing reservation data, input from said plurality of input keys operating as command input keys, to be used for facsimile communications; and a control section for setting said at least some of said plurality of command input keys as said numerical data input keys when said first switch is operated to select said facsimile function and said second switch is operated to switch said at least some of said plurality of command input keys to said numerical data input keys, for converting numerical data input from said numerical data input keys to dial data, and for controlling a storing operation of said reservation data to said storing means and a reading operation of said reservation data from said storing means.

2. A printer device with a facsimile function as claimed in claim 1, wherein said control section sets said plurality of command input keys to keys for inputting an operation command for said facsimile means when said first switch is operated to select said facsimile function, and sets said plurality of operation command input keys as keys for inputting an operation command for said printer means when said first switch is operated to select said printer function.

* * * * *